(12) United States Patent
Sundquist et al.

(10) Patent No.: US 10,688,697 B2
(45) Date of Patent: Jun. 23, 2020

(54) APPARATUS AND METHOD OF FORMING A COMPOSITE STRUCTURE

(71) Applicant: The Boeing Company, Chicago, IL (US)

(72) Inventors: David John Sundquist, St. Peters, MO (US); Trevor Lee Howard, St. Louis, MO (US); Eric Eldon Deck, St. Louis, MO (US); Steven J. Burpo, St. Charles, MO (US); Kurtis Shuldberg Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 15/004,622

(22) Filed: Jan. 22, 2016

(65) Prior Publication Data

US 2017/0210040 A1     Jul. 27, 2017

(51) Int. Cl.
*B29C 43/12*      (2006.01)
*B29C 53/02*      (2006.01)
(Continued)

(52) U.S. Cl.
CPC ........ *B29C 43/3642* (2013.01); *B29C 53/025* (2013.01); *B29C 70/44* (2013.01); *B29C 70/54* (2013.01); *B29L 2031/3076* (2013.01)

(58) Field of Classification Search
CPC ........ B29C 43/3642; B29C 2043/3649; B29C 53/04; B29C 53/06
See application file for complete search history.

(56) References Cited

U.S. PATENT DOCUMENTS

| 2,594,262 A | * | 4/1952 | Howe | A47B 3/087 |
| | | | | 108/81 |
| 4,844,398 A | * | 7/1989 | Konkle | A47B 1/04 |
| | | | | 248/240.4 |

(Continued)

FOREIGN PATENT DOCUMENTS

| EP | 2047972 A1 | 4/2009 |
| EP | 2116358 A1 | 11/2009 |

(Continued)

OTHER PUBLICATIONS

EP Extended Search Report for related application 16200344.6 dated Jun. 1, 2017, 8 pp.

(Continued)

*Primary Examiner* — Joseph S Del Sole
*Assistant Examiner* — Jerzi H Moreno Hernandez
(74) *Attorney, Agent, or Firm* — Armstrong Teasdale LLP (57) ABSTRACT

A drape forming apparatus for use in forming a composite structure. The apparatus includes a forming tool including an upper forming surface and at least one side forming surface that extends from the upper forming surface. The forming tool receives at least one layer of composite material over the upper forming surface. The apparatus also includes a flange forming device including a tray coplanarly aligned with the upper forming surface when in a first operating position. The tray is configured to receive a flange portion of the at least one layer of composite material. A pressurized bladder extends over the forming tool and the tray. The pressurized bladder is configured to induce a first force against the tray such that the tray rotates about a pivot line, and such that the flange portion is withdrawn from the tray and draped over the at least one side forming surface.

20 Claims, 6 Drawing Sheets

(51) Int. Cl.
*B29C 70/54* (2006.01)
*B29C 70/44* (2006.01)
*B29L 31/30* (2006.01)
*B29C 43/36* (2006.01)

(56) References Cited

U.S. PATENT DOCUMENTS

| | | | | |
|---|---|---|---|---|
| 5,114,654 | A | * | 5/1992 | Hosoi .................. B29C 51/004 |
| | | | | 264/313 |
| 5,549,051 | A | * | 8/1996 | Zimmerman ............ A47B 1/04 |
| | | | | 108/80 |
| 6,814,916 | B2 | | 11/2004 | Willden et al. |
| 7,118,370 | B2 | | 10/2006 | Willden et al. |
| 7,651,650 | B2 | | 1/2010 | Willden et al. |
| 8,142,181 | B2 | | 3/2012 | Willden et al. |
| 8,236,222 | B2 | | 8/2012 | Henderson et al. |
| 2006/0249883 | A1 | * | 11/2006 | Oguma .................. B29C 70/44 |
| | | | | 264/339 |
| 2009/0091063 | A1 | * | 4/2009 | Petersson ................ B29C 43/12 |
| | | | | 264/320 |
| 2010/0050388 | A1 | * | 3/2010 | Shaber ................. B29C 70/545 |
| | | | | 16/385 |
| 2010/0263789 | A1 | * | 10/2010 | Graber ................... B29B 11/16 |
| | | | | 156/228 |
| 2013/0341816 | A1 | * | 12/2013 | Bergmann ............ B29C 51/085 |
| | | | | 264/40.1 |
| 2015/0352795 | A1 | | 12/2015 | Coxon et al. |
| 2016/0207468 | A1 | * | 7/2016 | Fesenmyer ............... B60R 7/04 |
| 2017/0252982 | A1 | * | 9/2017 | Knutson .................. B29C 53/02 |
| 2018/0126604 | A1 | * | 5/2018 | Tokutomi ................ B29C 39/10 |

FOREIGN PATENT DOCUMENTS

| | | | |
|---|---|---|---|
| EP | 2954994 | A1 | 12/2015 |
| JP | 2010115867 | A * | 5/2010 |
| JP | 2010115867 | A | 5/2010 |
| JP | 2014051065 | A * | 3/2014 |

OTHER PUBLICATIONS

Anderson, Michael Robert et al.; "Systems and Methods for Drape Forming a Charge of Composite Material"; co-pending U.S. Appl. No. 14/883,894, filed Oct. 15, 2015.

* cited by examiner

APPARATUS AND METHOD OF FORMING A COMPOSITE STRUCTURE

BACKGROUND

The field of the present disclosure relates generally to composite structures and, more specifically, to systems and methods of hot drape forming composite structures.

At least some known composite structures are formed using a process known as hot drape forming. Hot drape forming typically includes heating one or more plies of flat pre-impregnated (i.e., prepreg) composite material, and forcing the composite material around a mandrel with a vacuum bag or a pressurized bladder device. Composite structures, such as composite charges, are formed from one or more plies of composite material. Forcing the composite material around the mandrel facilitates forming composite parts for use in the aerospace industry, for example. More specifically, at least some known composite parts include a body portion and a flange portion that is formed when forced around the mandrel. However, uncontrolled compression of the composite material when forced around the mandrel can result in buckling or wrinkling of the plies within a composite part.

BRIEF DESCRIPTION

In one aspect, a drape forming apparatus for use in forming a composite structure is provided. The apparatus includes a forming tool including an upper forming surface and at least one side forming surface that extends from the upper forming surface. The forming tool is configured to receive at least one layer of composite material extending over the upper forming surface. The apparatus also includes a flange forming device including a tray coplanarly aligned with the upper forming surface when in a first operating position. The tray is configured to receive a flange portion of the at least one layer of composite material. A pressurized bladder extends over the forming tool and the tray. The pressurized bladder is configured to induce a first force against the tray such that the tray rotates about a pivot line, and such that the flange portion is withdrawn from the tray and draped over the at least one side forming surface.

In another aspect, a flange forming device for use in forming a composite structure from at least one layer of composite material is provided. The device includes a standoff, and a tray coupled to the standoff. The tray is rotatable about a pivot line defined between the tray and the standoff. The tray is configured to receive a flange portion of the at least one layer of composite material, and is configured to rotate when a first force is induced against the tray. The device also includes a resistance device coupled to the tray. The resistance device is configured to provide a second force that opposes the first force to control a rate of rotation of the tray.

In yet another aspect, a method of forming a composite structure is provided. The method includes extending at least one layer of composite material over an upper forming surface of a forming tool, positioning a flange portion of the at least one layer of composite on a tray coplanarly aligned with the upper forming surface when the tray is in a first operating position, extending a pressurized bladder over the forming tool and the tray, and inducing, with the pressurized bladder, a first force against the tray such that the tray rotates about a pivot line, and such that the flange portion is withdrawn from the tray and draped over at least one side forming surface of the forming tool.

DETAILED DESCRIPTION

The implementations described herein relate to systems and methods of forming a composite structure having a flange. More specifically, the systems and methods described herein include a flange forming device that, when used in combination with a pressurized bladder, facilitates controlling the pressure induced to at least one layer of composite material used to form the composite structure. For example, a flange portion of the layer of composite material is received on a tray of the flange forming device, and the pressurized bladder induces a force on the tray. The tray is rotatable about a pivot line such that the flange portion is progressively withdrawn from the tray and draped over a forming tool. The rate of rotation of the tray is controlled to ensure a more uniform and controlled pressure is induced to the flange portion when formed around the forming tool. As such, the systems and methods described herein facilitate forming composite structures in a more reliable, easier, and defect reducing manner.

Figure 1:
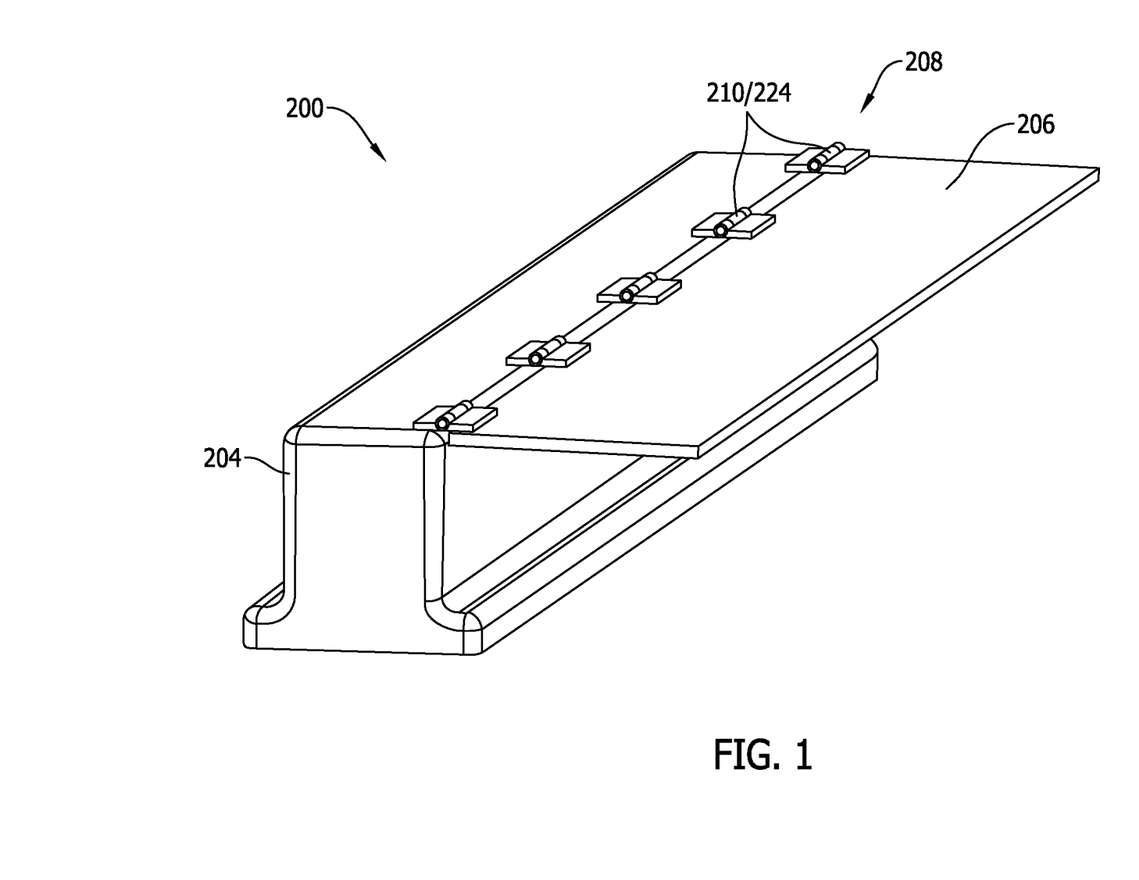
FIG. 1 is a perspective view of an exemplary flange forming device.
Figure 2:
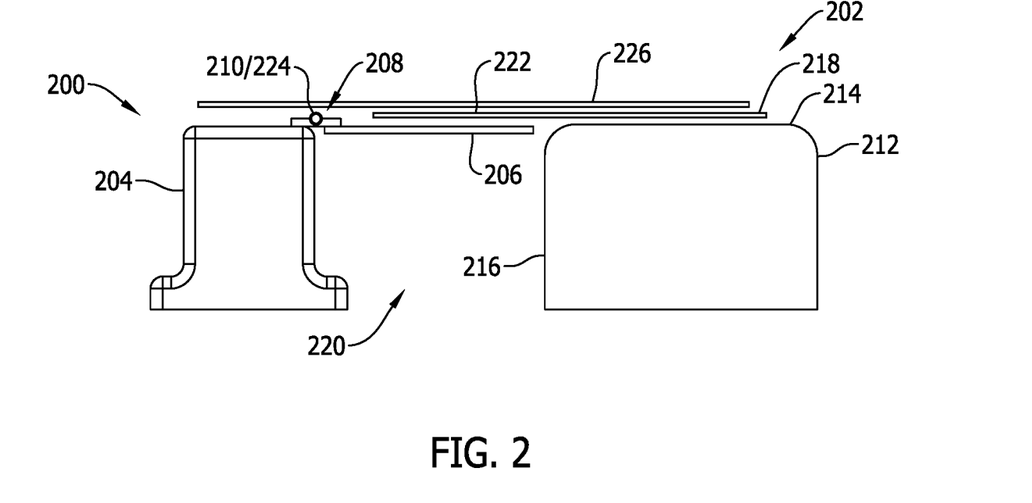
FIG. 2 is a side view illustration of an exemplary drape forming apparatus including the flange forming device shown in FIG. 1 in a first operating position.
Figure 3:
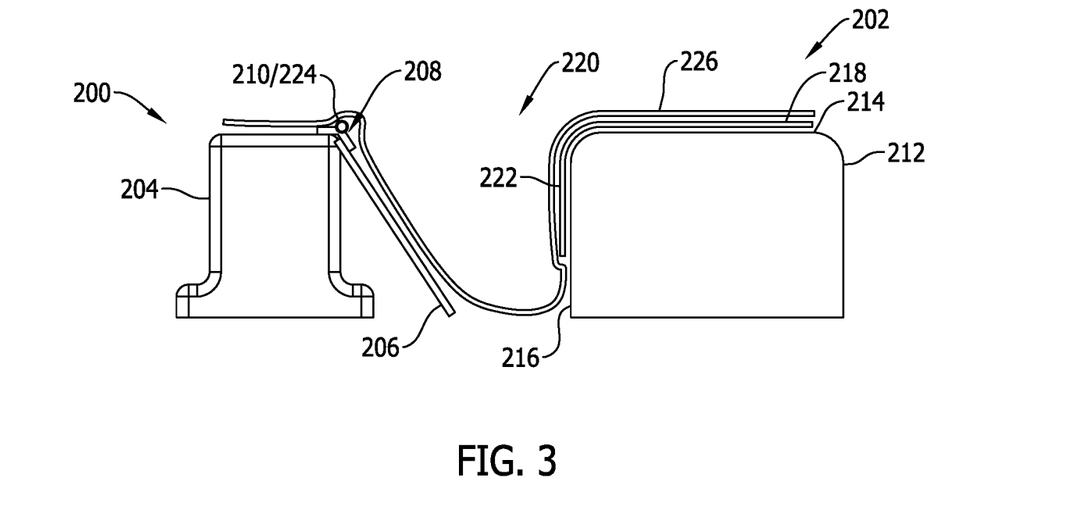
FIG. 3 is a side view illustration of the drape forming apparatus shown in FIG. 2 including the flange forming device in a second operating position.

FIG. 1 is a perspective view of an exemplary flange forming device 200, FIG. 2 is a side view illustration of an exemplary drape forming apparatus 202 including flange forming device 200 shown in FIG. 1 in a first operating position, and FIG. 3 is a side view illustration of drape forming apparatus 202 including flange forming device 200 in a second operating position. In the exemplary implementation, flange forming device 200 includes a standoff 204, and a tray 206 coupled to standoff 204. Tray 206 is rotatable about a pivot line 208 defined between tray 206 and standoff 204, and rotates when a first force is induced against tray 206. More specifically, as will be described in more detail below, a resistance device (not shown in FIG. 1) is coupled to tray 206. The resistance device facilitates maintaining tray 206 in the first operating position by providing a counteractive second force to tray 206 greater than the force of gravity, and tray 206 only rotates when the first force is greater than the second force provided by the resistance device. As shown in FIG. 1, tray 206 is coupled to standoff 204 via a hinge 210 such that tray 206 rotates relative to standoff 204 about pivot line 208. In one implementation, hinge 210 is positioned along pivot line 208.

Referring to FIG. 2, drape forming apparatus 202 includes flange forming device 200 and a forming tool 212. Forming tool 212 includes an upper forming surface 214 and at least one side forming surface 216 that extends substantially perpendicularly from upper forming surface 214. As will be described in more detail below, forming tool 212 receives at least one layer 218 of composite material for forming a composite structure, having a flange, on forming tool 212 in-situ. In an alternative implementation, side forming surface 216 has any contour and extends from upper forming surface 214 in any orientation that enables drape forming apparatus 202 to function as described herein.

In the exemplary implementation, standoff 204 is positioned a distance from forming tool 212 such that a gap 220 is defined therebetween. Tray 206 extends across gap 220 towards forming tool 212 when flange forming device 200 is in the first operating position. More specifically, tray 206 is substantially coplanarly aligned with upper forming surface 214 when flange forming device 200 is in the first operating position. As such, when in the first operating position, tray 206 is positioned to receive a flange portion 222 of at least one layer 218 of composite material. At least one layer 218 is then heated, when embodied as prepreg, to facilitate softening the matrix material embedded therein. In one implementation, a heat blanket (not shown) covering at least one layer 218 is used to soften the matrix material. Alternatively, heat lamps (not shown) may be used to heat the at least one layer 218.

As described above, flange forming device 200 includes a resistance device that facilitates maintaining tray 206 in the first operating position by providing a counteractive second force to tray 206 greater than the force of gravity. In one implementation, the resistance device is embodied as a friction hinge 224 coupled between standoff 204 and tray 206. Friction hinges, also known as torque hinges, provide torque between rotatable components thereof about a common axis. As such, friction hinge 224 provides the second force capable of maintaining tray 206 in the first operating position.

Drape forming apparatus 202 also includes a pressurized bladder 226 that extends over forming tool 212 and tray 206. In the exemplary implementation, pressurized bladder 226 is fabricated from an elastically deformable material, and is pressurized to induce the first force against tray 206 such that tray 206 rotates about pivot line 208. More specifically, pressurized bladder 226 induces the first force of up to about 15 pounds per square inch (psi) (about 103 kilopascals (kPa)) against tray 206. The resistance device provides the counteractive second force that is less than the first force induced by pressurized bladder 226. As such, the rate of rotation of tray 206 is controlled to reduce the formation of wrinkles within flange portion 222.

Referring to FIG. 2, the first force induced by pressurized bladder 226 is greater than the second force provided by friction hinge 224. As such, pressurized bladder 226 forces tray 206 from the first operating position towards the second operating position. Moreover, flange portion 222 is withdrawn from tray 206 and draped over side forming surface 216 as tray 206 rotates about pivot line 208. More specifically, pressurized bladder 226 progressively covers flange portion 222 as flange portion 222 is withdrawn from tray 206. As such, pressure is gradually applied to flange portion 222 to facilitate reducing wrinkle formation therein. Pressurized bladder 226 then biases at least one layer 218 against upper forming surface 214 and side forming surface 216 to form the composite structure. As such, pressurized bladder 226 applies a substantially uniform pressure across at least one layer 218 and holds at least one layer 218 in place on forming tool 212 as the temperature of the at least one layer 218 is reduced, thereby forming the composite structure. In an alternative implementation, a slip film (not shown) or any other suitable friction reducing device may be positioned between tray 206 and flange portion 222 to facilitate reducing the formation of wrinkles in flange portion 222.

Figure 4:
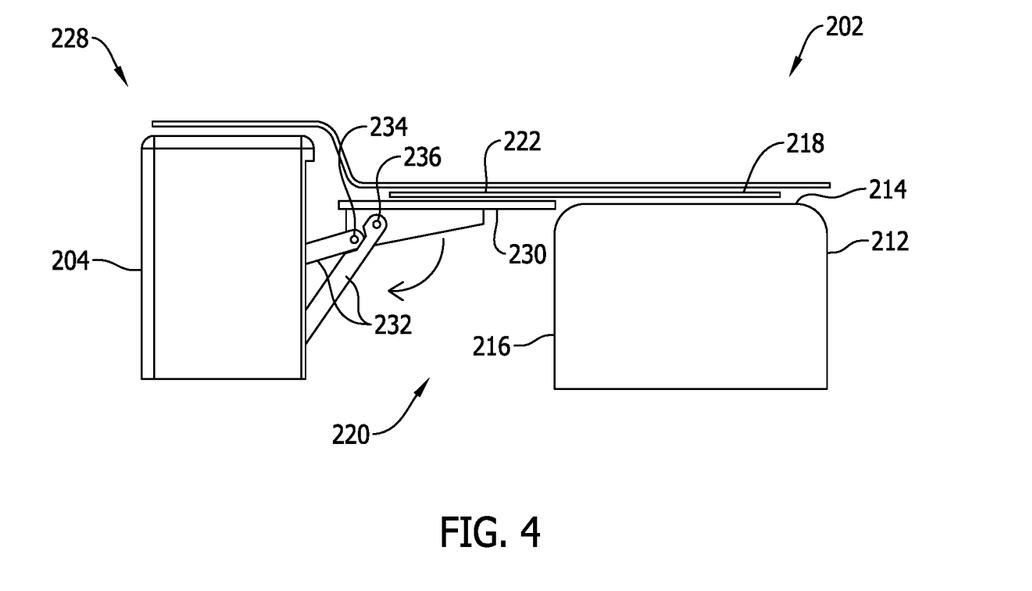
FIG. 4 is a side view illustration of the drape forming apparatus including a flange forming device in accordance with a second embodiment of the disclosure, in a first operating position.
Figure 5:
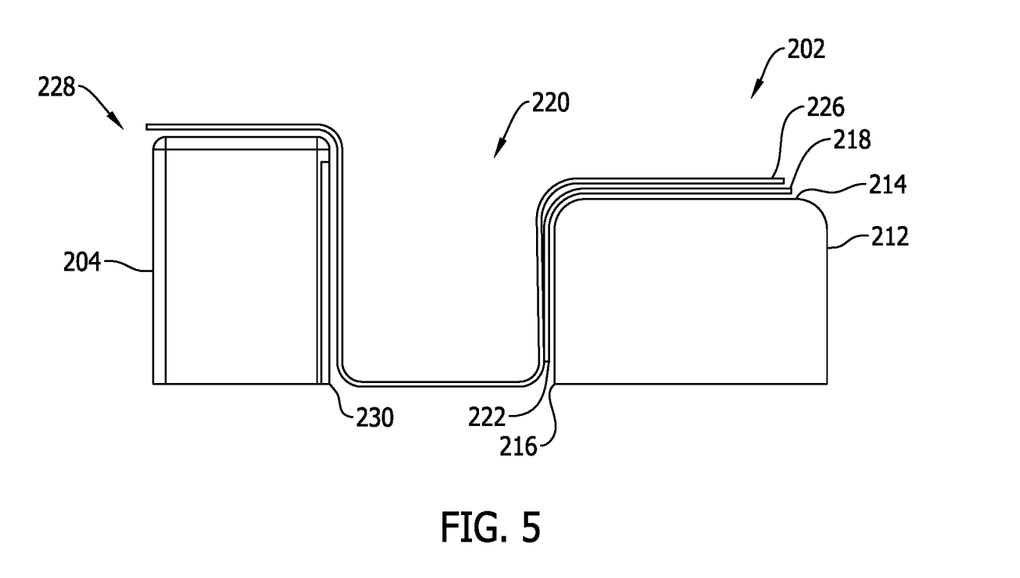
FIG. 5 is a side view illustration of the drape forming apparatus shown in FIG. 4 including the flange forming device in a second operating position.

FIG. 4 is a side view illustration of drape forming apparatus 202 including a flange forming device 228 in accordance with a second embodiment of the disclosure, in a first operating position, and FIG. 5 is a side view illustration of drape forming apparatus 202 including flange forming device 228 in a second operating position. In the exemplary implementation of FIGS. 4 and 5, flange forming device 228 includes the resistance device embodied as a retractable hinged tray 230 coupled to standoff 204, in place of tray 206 and friction hinge 224 (shown in FIGS. 2 and 3). Retractable hinged tray 230 is coupled to standoff 204 via rotatable levers 232. Retractable hinged tray 230 is rotatable about a first pivot line 234 and a second pivot line 236 defined between rotatable levers 232 and retractable hinged tray 230, and rotatable levers 232 are rotatable about pivot lines (not shown) defined between rotatable levers 232 and standoff 204, thereby defining a range of motion for retractable hinged tray 230 to be fully retractable within standoff 204. As such, the range of motion facilitates reducing friction between at least one layer 218 of composite material and retractable hinged tray 230 as at least one layer 218 is withdrawn therefrom, and facilitates reducing the likelihood of pressurized bladder 226 from becoming caught between standoff 204 and retractable hinged tray 230.

Figure 6:
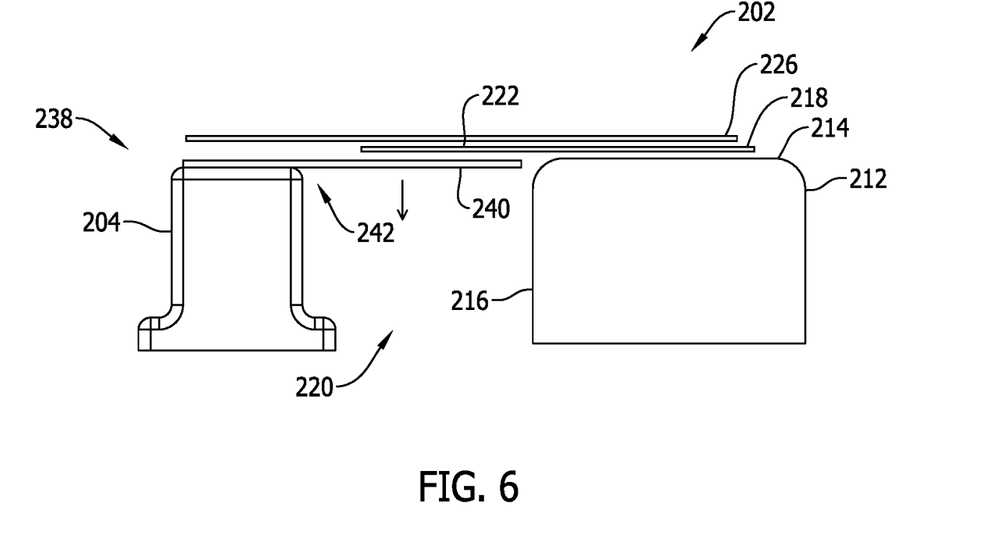
FIG. 6 is a side view illustration of the drape forming apparatus including a flange forming device in accordance with a third embodiment of the disclosure, in a first operating position.
Figure 7:
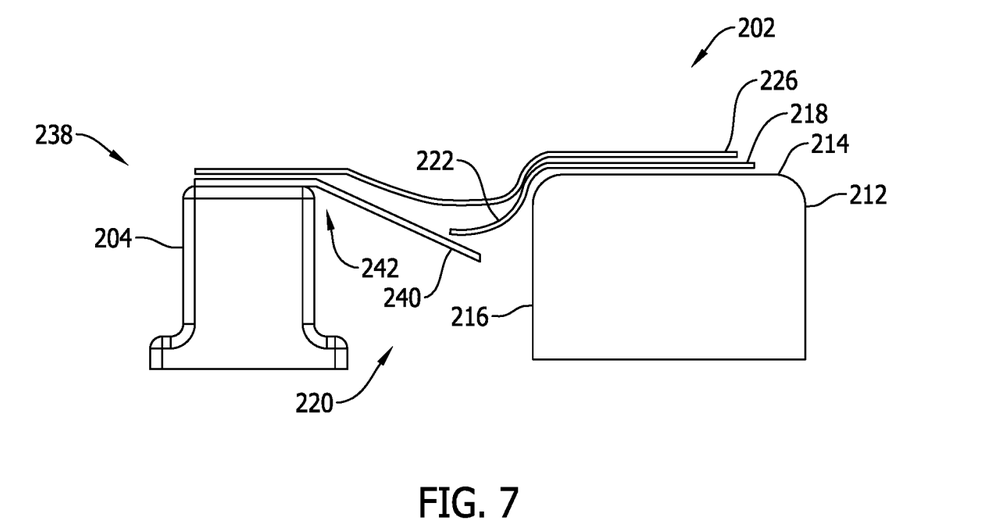
FIG. 7 is a side view illustration of the drape forming apparatus shown in FIG. 8 including the flange forming device in a second operating position.

FIG. 6 is a side view illustration of drape forming apparatus 202 including a flange forming device 238 in accordance with a third embodiment of the disclosure, in a first operating position, and FIG. 7 is a side view illustration of drape forming apparatus 202 including flange forming device 238 in a second operating position. In the exemplary implementation of FIGS. 6 and 7, flange forming device 238 includes the resistance device embodied as an elongated tray 240 coupled to standoff 204, in place of tray 206 and friction hinge 224 (shown in FIGS. 2 and 3). Elongated tray 240 includes a reinforced portion 242 defined at pivot line 208. More specifically, elongated tray 240 is a single unitary structure, and deflects when the first force is induced against elongated tray 240. As such, reinforced portion 242 provides the counteractive second force to elongated tray 240 to control the rate of rotation of elongated tray 240 without having any moving parts. Reinforced portion 242 may be fabricated from the same material as elongated tray 240, or may be fabricated from a different stiffer material. When fabricated from the same material, reinforced portion 242 may have an increased thickness to increase the stiffness thereof.

Figure 8:
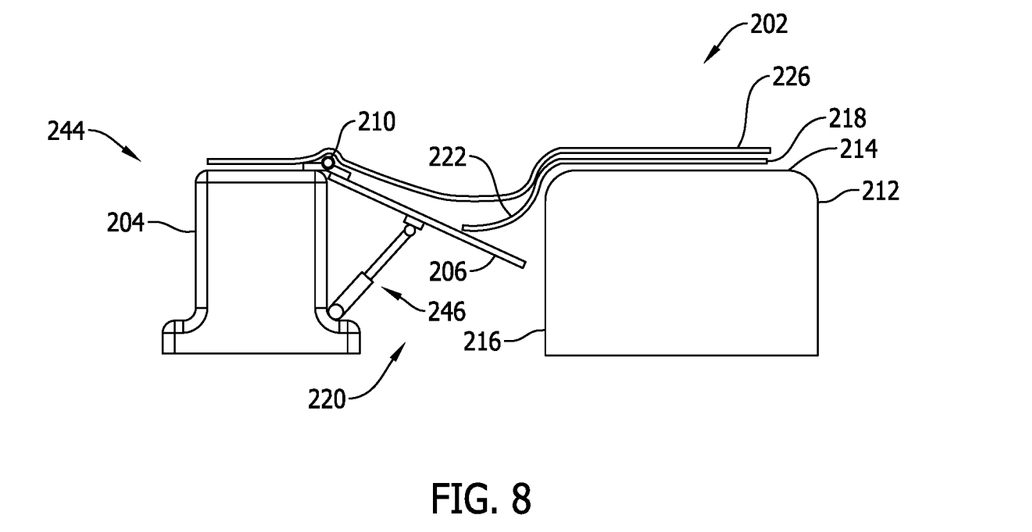
FIG. 8 is a side view illustration of the drape forming apparatus including a flange forming device in accordance with a fourth embodiment of the disclosure.

FIG. 8 is a side view illustration of drape forming apparatus 202 including a flange forming device 244 in accordance with a fourth embodiment of the disclosure. In the exemplary implementation, flange forming device 244 includes the resistance device embodied as a linear actuator 246 extending between standoff 204 and tray 206. For example, linear actuator 246 can be used as an alternative to friction hinge 224 of the embodiment shown in FIGS. 2 and 3. Linear actuator 246 may be actuated by any suitable means such as, but not limited to, electrical and pneumatic. As such, the rate of rotation of tray 206 can be controlled using linear actuator 246 in a more regulated manner than conventional drape forming systems.

Figure 9:
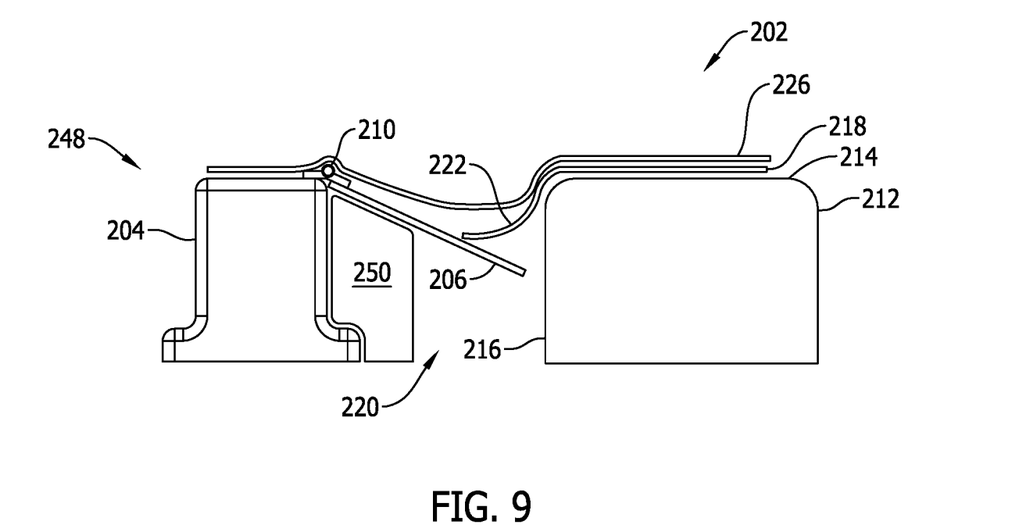
FIG. 9 is a side view illustration of the drape forming apparatus including a flange forming device in accordance with a fifth embodiment of the disclosure.

FIG. 9 is a side view illustration of drape forming apparatus 202 including a flange forming device 248 in accordance with a fifth embodiment of the disclosure. In the exemplary implementation, flange forming device 248 includes the resistance device embodied as an inflatable bladder 250 positioned adjacent standoff 204 and tray 206. For example, inflatable bladder 250 can be used as an alternative to friction hinge 224 of the embodiment shown in FIGS. 2 and 3. Inflatable bladder 250 may be selectively filled with any suitable fluid, which enables inflatable bladder 250 to bias against tray 206 and provide the counteractive second force thereto. As pressure is applied by pressurized bladder 226, tray 206 deforms inflatable bladder 250 as tray 206 rotates about pivot line 208. As such, the rate of rotation of tray 206 can be controlled using inflatable bladder 250 in a more regulated manner than conventional drape forming systems.

Figure 10:
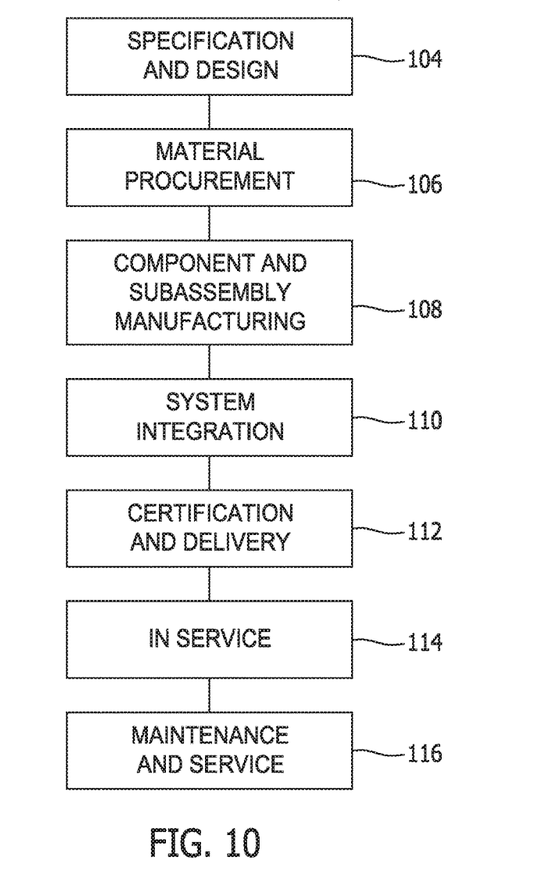
FIG. 10 is a flow diagram of an exemplary aircraft production and service method.
Figure 11:
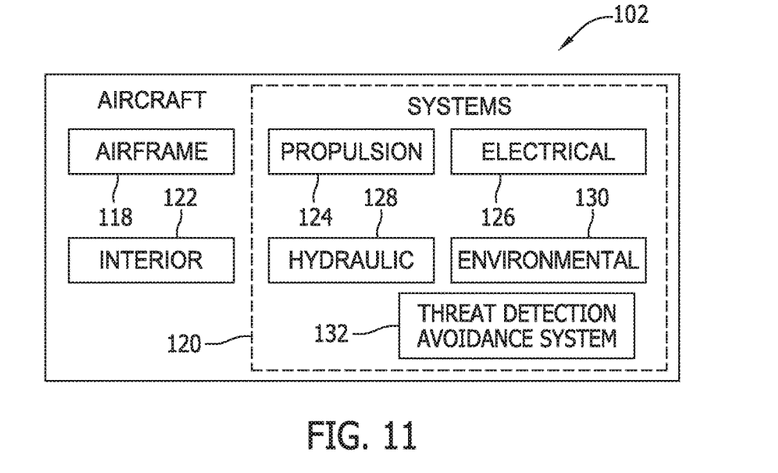
FIG. 11 is a block diagram of an exemplary aircraft.

Implementations of the disclosure may be described in the context of an aircraft manufacturing and service method 100 (shown in FIG. 10) and via an aircraft 102 (shown in FIG. 11). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented on platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, aircraft 102 produced via method 100 may include an airframe 118 having a plurality of systems 120 and an interior 122. Examples of high-level systems 120 include one or more of a propulsion system 124, an electrical system 126, a hydraulic system 128, an environmental system 130, and/or a threat detection/avoidance system 132. Threat detection/avoidance system 132 may be embodied as one or more sensors for detecting a threat received at aircraft 102, and a computing device for analyzing the threat and determining avoidance techniques for aircraft 102, as will be described in more detail below. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

A method of forming a composite structure is also described herein. Referring to FIGS. 2 and 3, the method includes extending at least one layer 218 of composite material over upper forming surface 214 of forming tool 212, positioning flange portion 222 of at least one layer 218 of composite on tray 206 coplanarly aligned with upper forming surface 214 when tray 206 is in a first operating position, extending pressurized bladder 226 over forming tool 212 and tray 206, and inducing, with pressurized bladder 226, a first force against tray 206 such that tray 206 rotates about pivot line 208, and such that flange portion 222 is withdrawn from tray 206 and draped over at least one side forming surface 216 of forming tool 212.

In one implementation, the method further includes positioning standoff 204 a distance from forming tool 212 such that gap 220 is defined therebetween, wherein tray 206 is coupled to standoff 204 and extends across gap 220 towards forming tool 212 when in the first operating position. The method also includes rotating tray 206 about hinge 210 coupled between standoff 204 and forming tool 212.

In one implementation, the method includes coupling the resistance device to tray 206, and providing a second force, by the resistance device, to tray 206 to control a rate of rotation of tray 206. The second force opposes the first force. Inducing a first force includes inducing the first force of up to about 15 pounds per square inch (psi) against tray 206, and the resistance device is configured to provide the second force that is less than the first force. The resistance device can be embodied as a friction hinge 224 (shown in FIGS. 2 and 3), rotatable levers 232 (shown in FIGS. 4 and 5), reinforced portion 242 (shown in FIGS. 6 and 7), linear actuator 246 (shown in FIG. 8), or inflatable bladder 250 (shown in FIG. 9). Moreover, inducing a first force includes forcing flange portion 222 against at least one side forming surface 216 as tray 206 rotates about pivot line 208.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drape forming apparatus for use in forming a composite structure, said apparatus comprising:
    a forming tool comprising an upper forming surface and at least one side forming surface that extends from said upper forming surface, said forming tool configured to receive at least one layer of composite material extending over said upper forming surface;
    a flange forming device comprising:
        a standoff positioned a distance from the forming tool such that a gap is defined between the standoff and the forming tool; and
        a tray coupled to the standoff and extending across the gap towards the forming tool when in a first operating position, said tray coplanarly aligned with said upper forming surface for supporting a flange portion of the at least one layer of composite material when in the first operating position, said tray rotatable from the first operating position to a second operating position in which said tray is misaligned from said upper forming surface;
        a pneumatic actuator extending between said standoff and said tray, said pneumatic actuator configured to control a rate of rotation of said tray from the first operating position to the second operating position; and
    a pressurized bladder configured to extend over said forming tool and said tray, said pressurized bladder configured to induce a first force against said tray such that said tray rotates about a pivot line from the first operating position to the second operating position, wherein the flange portion is withdrawn from said tray and is draped over said at least one side forming surface when the tray is rotated.

2. The apparatus in accordance with claim 1, wherein said tray is coupled to said standoff via a hinge such that said tray rotates relative to said standoff.

3. The apparatus in accordance with claim 1, wherein said pneumatic actuator is configured to provide a second force that opposes the first force to control the rate of rotation of said tray.

4. The apparatus in accordance with claim 3, wherein said pressurized bladder is configured to induce the first force of up to 15 pounds per square inch (psi) (103 kilopascals (kPa)) against said tray, and said pneumatic actuator is configured to provide the second force that is less than the first force.

5. The apparatus in accordance with claim 1 further comprising a hinge coupled between said standoff and said tray.

6. The apparatus in accordance with claim 1, wherein said pressurized bladder is further configured to force the flange portion against said at least one side forming surface as said tray rotates about the pivot line.

7. The apparatus in accordance with claim 2, wherein said hinge comprises a friction hinge.

8. The apparatus in accordance with claim 1, wherein said pneumatic actuator extends linearly between said standoff and said tray.

9. A flange forming device for use in forming a composite structure from at least one layer of composite material, said device comprising:
    a standoff;
    a tray coupled to said standoff, said tray is rotatable, between a first operating position and a second operating position, about a pivot line defined between said tray and said standoff, wherein said tray is configured to support a flange portion of the at least one layer of composite material when said tray is in the first operating position and is configured to rotate from the first operating position to the second operating position when a first force is induced against said tray, wherein the flange portion is configured to be withdrawn from said tray when said tray is rotated to the second operating position; and
    a pneumatic actuator extending between said standoff and said tray, said pneumatic actuator configured to provide a second force that opposes the first force to control a rate of rotation of said tray from the first operating position to the second operating position.

10. The device in accordance with claim 9, wherein said tray is coupled to said standoff via a hinge.

11. The device in accordance with claim 9, wherein the first force of up to 15 pounds per square inch (psi) (103 kilopascals (kPa)) is induced against said tray, and said pneumatic actuator is configured to provide the second force that is less than the first force.

12. The device in accordance with claim 10, wherein said hinge comprises a friction hinge.

13. The device in accordance with claim 9, wherein said pneumatic actuator extends linearly between said standoff and said tray.

14. A method of forming a composite structure, said method comprising:
    providing a flange forming device including a standoff, a tray coupled to the standoff, and a pneumatic actuator extending between the standoff and the tray, wherein the tray is configured to rotate between a first operating position and a second operating position;
    extending at least one layer of composite material over an upper forming surface of a forming tool;
    positioning a flange portion of the at least one layer of composite material on the tray when the tray is in the first operating position in which the tray is coplanarly aligned with the upper forming surface;
    extending a pressurized bladder over the forming tool and the tray;
    inducing, with the pressurized bladder, a first force against the tray such that the tray rotates about a pivot line from the first operating position to the second operating position in which the tray is misaligned from the upper forming surface, and such that the flange portion is withdrawn from the tray and draped over at least one side forming surface of the forming tool; and
    controlling, with the pneumatic actuator, a rate of rotation of the tray from the first operating position to the second operating position.

15. The method in accordance with claim 14 further comprising positioning the standoff a distance from the forming tool such that a gap is defined therebetween, wherein the tray extends across the gap towards the forming tool when in the first operating position.

16. The method in accordance with claim 15, wherein the tray is coupled to the standoff via a hinge.

17. The method in accordance with claim 14, wherein the step of inducing the first force comprises inducing the first force of up to 15 pounds per square inch (psi) (103 kilopascals (kPa)) against the tray, and the pneumatic actuator is configured to provide the second force that is less than the first force.

18. The method in accordance with claim 14, wherein the step of inducing the first force comprises forcing the flange portion against the at least one side forming surface as the tray rotates about the pivot line.

19. The method in accordance with claim 14, wherein the step of inducing the first force comprises forcing, with the pressurized bladder, the flange portion against the at least one side forming surface as the tray rotates about the pivot line.

20. The method in accordance with claim 14, wherein the step of inducing the first force comprises providing a second force that opposes the first force to control the rate of rotation of the tray.

\* \* \* \* \*